United States Patent
Shitrit et al.

(10) Patent No.: US 11,951,553 B2
(45) Date of Patent: Apr. 9, 2024

(54) ROTATABLE CUTTING HEAD HAVING TIP PORTION WITH THREE RADIALLY EXTENDING CUTTING EDGES FORMING A RECTILINEAR ROTATIONAL PROFILE

(71) Applicant: ISCAR, LTD., Tefen (IL)

(72) Inventors: Shim'on Shitrit, Kibbutz Metsuba (IL); Hytham Kablan, Bet Jaan (IL)

(73) Assignee: ISCAR, LTD., Tefen (IL)

( * ) Notice: Subject to any disclaimer, the term of this patent is extended or adjusted under 35 U.S.C. 154(b) by 290 days.

(21) Appl. No.: 17/215,223

(22) Filed: Mar. 29, 2021

(65) Prior Publication Data

US 2022/0305571 A1    Sep. 29, 2022

(51) Int. Cl.
    *B23B 51/02*    (2006.01)
(52) U.S. Cl.
    CPC .......... *B23B 51/02* (2013.01); *B23B 2251/04* (2013.01); *B23B 2251/047* (2022.01);
    (Continued)
(58) Field of Classification Search
    CPC .............. B23B 51/02; B23B 2251/082; B23B 2251/0825; B23B 2251/08;
    (Continued)

(56) References Cited

U.S. PATENT DOCUMENTS 5,149,234 A * 9/1992 Durfee, Jr. .............. B23B 51/00
                                                            408/199
5,957,631 A   9/1999 Hecht
(Continued)

FOREIGN PATENT DOCUMENTS

DE    102008029404 A1 * 12/2009 ............. B23B 51/02
DE    102020101826 A1 *  8/2020 ............. B23C 5/10
(Continued)

OTHER PUBLICATIONS

International Search Report dated Jul. 7, 2022, issued in PCT counterpart application (No. PCT/IL2022/050249).
(Continued)

*Primary Examiner* — Alan Snyder
*Assistant Examiner* — Reinaldo A Del Vargas Rio
(74) *Attorney, Agent, or Firm* — Womble Bond Dickinson (US) LLP

(57) ABSTRACT

A cutting head rotatable about a central axis, comprising a tip portion and an intermediate portion. The tip portion has an axially forwardmost tip point contained in the central axis and three axially forward facing front surfaces forming three chisel edges extending axially rearwardly away from the tip point, each front surface having a radially extending cutting edge comprising a secondary cutting-edge portion extending radially outwardly from one of the chisel edges, and a primary cutting-edge portion extending radially outwardly therefrom. Each primary cutting-edge portion is contained in an imaginary annular ring surface having an annular ring width spanning at least radially inner and outer end points thereof. In a front-end view of the cutting head, each primary cutting-edge portion is concave, and radial planes intersect the imaginary annular surface to form imaginary rectilinear lines, each having a length equal to the annular ring width.

23 Claims, 9 Drawing Sheets

(52) U.S. Cl.
CPC ..... *B23B 2251/082* (2013.01); *B23B 2251/14* (2013.01); *B23B 2251/18* (2013.01); *B23B 2251/202* (2013.01)

(58) Field of Classification Search
CPC ............ B23B 2251/14; B23B 2251/18; B23B 2251/202; B23B 2251/04
See application file for complete search history.

(56) References Cited

U.S. PATENT DOCUMENTS

| | | |
|---|---|---|
| 6,109,841 A | 8/2000 | Johne |
| 6,276,879 B1 | 8/2001 | Hecht |
| 6,582,164 B1 | 6/2003 | McCormick |
| 7,309,196 B2 | 12/2007 | Ruy Frota de Souza |
| 7,360,974 B2 | 4/2008 | Borschert et al. |
| 7,377,730 B2 | 5/2008 | Hecht et al. |
| 7,467,915 B2 | 12/2008 | de Souza |
| 7,832,966 B2 * | 11/2010 | Shultz ................... B23B 51/02 451/48 |
| 7,972,094 B2 | 7/2011 | Men et al. |
| 8,021,088 B2 | 9/2011 | Hecht |
| 8,534,966 B2 | 9/2013 | Hecht |
| 8,556,552 B2 | 10/2013 | Hecht |
| 8,992,141 B2 | 3/2015 | Hecht et al. |
| 8,992,142 B2 | 3/2015 | Hecht |
| 9,028,180 B2 | 5/2015 | Hecht |
| 10,071,430 B2 | 9/2018 | Frota De Souza Filho et al. |
| 10,183,342 B2 * | 1/2019 | Bonhomme ............ B23B 51/02 |
| 10,279,398 B2 * | 5/2019 | Fujiwara ................ B23B 51/02 |
| 2009/0116920 A1 | 5/2009 | Bae |
| 2012/0315101 A1 | 12/2012 | Osawa et al. |
| 2015/0266107 A1 | 9/2015 | Gonen et al. |
| 2017/0100784 A1 | 4/2017 | Frota De Souza Filho et al. |
| 2018/0065191 A1 | 3/2018 | Hecht |
| 2019/0262910 A1 | 8/2019 | Bonfiglio et al. |
| 2020/0108449 A1 * | 4/2020 | Brodski .............. B23B 51/0003 |
| 2020/0346290 A1 * | 11/2020 | Hirosawa ................ B23B 51/02 |
| 2021/0229190 A1 * | 7/2021 | Yamamoto ............. B23B 51/02 |

FOREIGN PATENT DOCUMENTS

| | | | |
|---|---|---|---|
| KR | 101220899 B1 * | 11/2013 | |
| WO | WO-2012072652 A1 * | 6/2012 | ............ B23B 51/02 |

OTHER PUBLICATIONS

Written Opinion dated Jul. 7, 2022, issued in PCT counterpart application (No. PCT/IL2022/050249).

* cited by examiner

ROTATABLE CUTTING HEAD HAVING TIP PORTION WITH THREE RADIALLY EXTENDING CUTTING EDGES FORMING A RECTILINEAR ROTATIONAL PROFILE

FIELD OF THE INVENTION

The present invention relates to a rotatable cutting head having a tip portion with three radially extending cutting edges, for use in metal cutting processes in general, and for drilling operations in particular.

BACKGROUND OF THE INVENTION

Within the field of cutting tools used in drilling operations, there are many examples of rotatable cutting heads having radially extending cutting edges, cutting-edge portions of which form an approximate rectilinear rotational profile.

U.S. Pat. No. 7,832,966 discloses a helical drill configuration that allows substantially flat-bottomed holes to be machined. At the cutting end of the body member, there are two cutting edges symmetrically oriented on opposing sides of the rotational axis of the drill. In an embodiment, first and second cutting edge portions form a continuous surface which provides strength and tool stability. The height of the second portions of each of the cutting edges remains relatively consistent along the horizontal for formation of a generally flat bottom hole. In the embodiment, a center point is defined by two sloped peak surfaces. A central straight chisel edge is formed by the intersection of the two sloped peak surfaces. The first cutting edge section extends from the chisel edge to the second cutting edge section. The first cutting edge section for both cutting edges is formed by symmetrically thinning the two-peak surface. Stress at the center portion of the helical cutting tool is limited by the chisel edge and first sections of the cutting edge near the center portion having a balanced geometry. The balanced geometry of the helical drill also prevents the drill from wobbling and creating deviations in the hole being formed. The chisel edge may blend with a first curvilinear cutting edge and the first curvilinear cutting edge may also have a positive rake to promote cutting.

US 2019/262910 A1 discloses a drill which include a plurality of lands that extend to a cutting edge, where adjacent lands are separated by flutes comprising a base contour arranged in a generally helical configuration along a centerline axis of a drill body. The drill also includes a plurality of contoured drill points each having a linear portion that extends towards an outer diameter of the drill body, and an arcuate portion that extends from the linear portion and towards a chisel of the drill body. The drill further includes a plurality of gash contours positioned within the plurality of flutes. The gash contours extend from the chisel of the drill body, and the gash contours are oblique to the base contours of the flutes.

It is an object of the present invention to provide an improved rotatable cutting head having three radially extending cutting edges, cutting-edge portions of which are configured to form a truly rectilinear rotational profile.

It is also an object of the present invention to provide an improved rotatable cutting head having three circumferentially spaced apart chip evacuation passages with head flutes configured to maximize the volume of the chip evacuation passages.

It is a further object of the present invention to provide an improved rotatable cutting head capable of machining a virtually flat shoulder surface between two coaxial through holes having different diameters.

SUMMARY OF THE INVENTION

In accordance with the present invention, there is provided a cutting head rotatable about a central axis in a direction of rotation, the central axis defining a forward-to-rearward axial direction, and comprising:
  a tip portion having an axially forwardmost tip point contained in the central axis and three axially forward-facing front surfaces forming three chisel edges extending axially rearwardly away from the tip point,
    each front surface having a radially extending cutting edge comprising a secondary cutting-edge portion extending radially outwardly from one of the chisel edges, and a primary cutting-edge portion extending radially outwardly either directly from said secondary cutting-edge portion or via a transitional cutting-edge portion; and
    each front surface further including a primary relief surface adjacent its respective primary cutting-edge portion, and
  an intermediate portion having three head lands circumferentially alternating with three chip evacuation passages, each head land having a leading edge extending axially rearwardly from the tip portion, and each chip evacuation passage having a head flute extending axially rearwardly from the tip portion and intersecting one of the leading edges,
wherein:
  each primary cutting-edge portion has a radially inner primary end point and a radially outer primary end point, and a primary median point between said radially inner and outer primary end points, the three radially outer primary end points defining a first imaginary circle having a first diameter, the three primary median points defining a second imaginary circle having a second diameter, and the three radially inner primary end points defining a third imaginary circle having a third diameter,
  the radially outer primary end point, the primary median point, and the radially inner primary end point of one of the primary cutting-edge portions are respectively contained in first, second, and third imaginary radial planes, each of the first, second, and third imaginary radial planes containing the central axis,
  each primary cutting-edge portion is contained in a first imaginary annular ring surface having a first annular ring width spanning at least the radially inner and outer primary end points, and
  in a front-end view of the cutting head, each primary cutting-edge portion is concave,
  and wherein:
  the first, second, and third imaginary radial planes intersect the first imaginary annular ring surface to respectively form first, second, and third imaginary rectilinear lines, each having a length equal to the first annular ring width.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
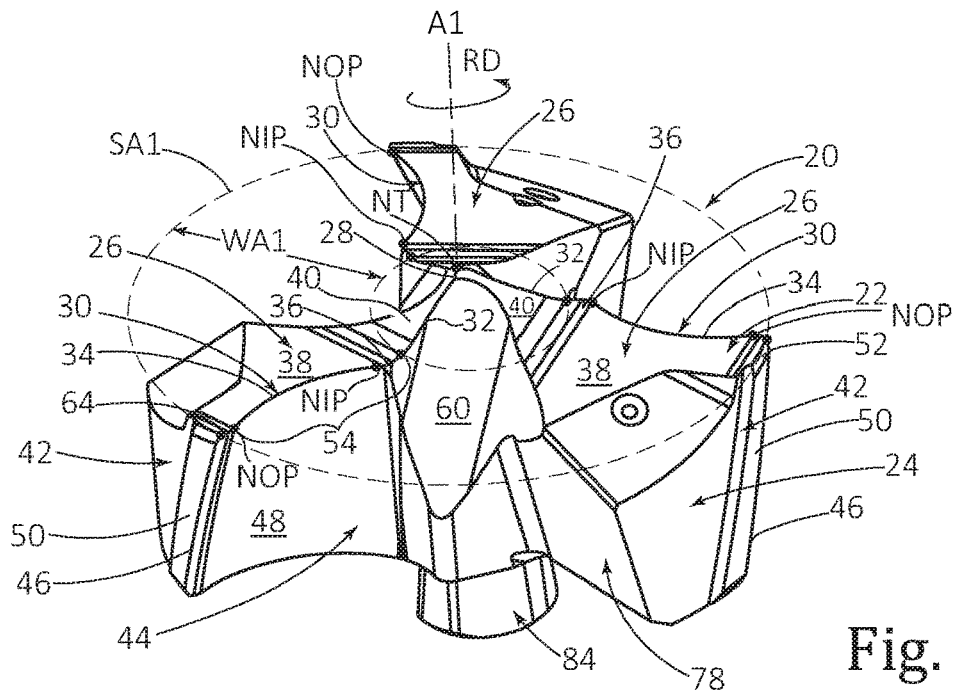
FIG. 1 is a perspective view of a cutting head in accordance with the present invention.
Figure 2:
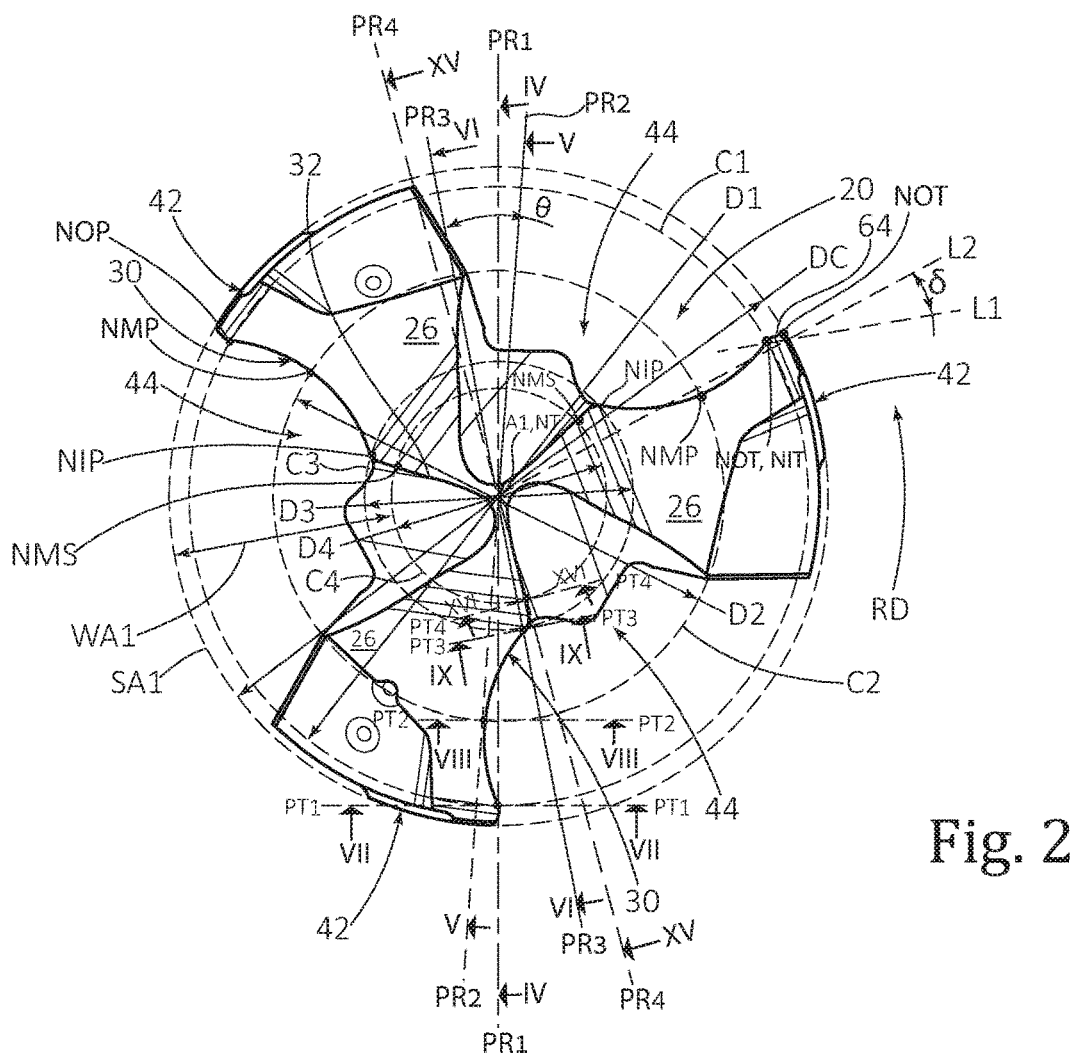
FIG. 2 is a top view of the cutting head shown in FIG. 1.
Figure 3:
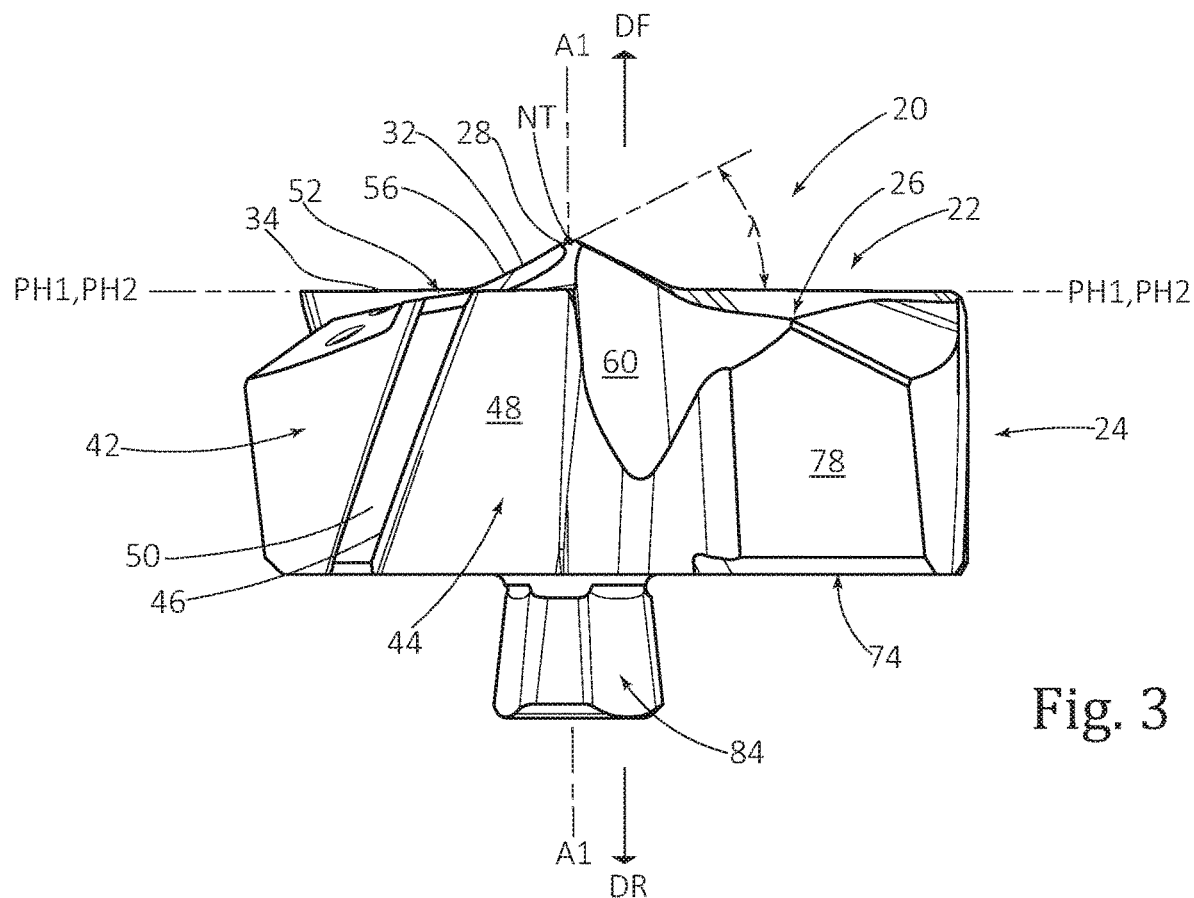
FIG. 3 is a side view of the cutting head shown in FIG. 1.

Attention is first drawn to FIGS. 1 to 3, showing a cutting head 20 rotatable about a central axis A1 in a direction of rotation RD, comprising a tip portion 22 and an intermediate portion 24.

The central axis A1 defines a forward-to-rearward axial direction DF, DR.

In some embodiments of the present invention, the cutting head 20 may be manufactured by form pressing and sintering a cemented carbide, such as tungsten carbide, and may be coated or uncoated.

As shown in FIGS. 1 to 3, the tip portion 22 has an axially forwardmost tip point NT contained in the central axis A1 and three axially forward-facing front surfaces 26 forming three chisel edges 28 extending axially rearwardly away from the tip point NT.

As shown in FIG. 2, each front surface 26 has a radially extending cutting edge 30 comprising a secondary cutting-edge portion 32 extending axially rearwardly and radially outwardly from one of the chisel edges 28, and a primary cutting-edge portion 34 extending radially outwardly either directly from said secondary cutting-edge portion 32 or via a transitional cutting-edge portion 36.

It should be appreciated that providing the cutting head 20 with three radially extending cutting edges 30 compared to, for example, two radially extending cutting edges, enables the cutting head 20 to perform drilling operations at higher feed rates.

In some embodiments of the present invention, the cutting head 20 may exhibit 3-fold rotational symmetry about the central axis A1.

Each front surface 26 includes a primary relief surface 38 adjacent its respective primary cutting-edge portion 34 and a secondary relief surface 40 adjacent its respective secondary cutting-edge portion 32.

As shown in FIGS. 1 to 3, the intermediate portion 24 has three head lands 42 circumferentially alternating with three chip evacuation passages 44, each head land 42 having a leading edge 46 extending axially rearwardly from the tip portion 22, and each chip evacuation passage 44 having a head flute 48 extending axially rearwardly from the tip portion 22 and intersecting one of the leading edges 46.

In some embodiments of the present invention, each primary cutting-edge portion 34 may be formed at the intersection of one of the head flutes 48 and one of the primary relief surfaces 38.

As shown in FIG. 2, the three leading edges 46 may define a cutting diameter DC.

In some embodiments of the present invention, each leading edge 46 may extend opposite the direction of rotation RD as it extends axially rearwardly from the tip portion 22.

Also, in some embodiments of the present invention, each leading edge 46 may extend helically along the central axis A1.

As shown in FIGS. 1 to 3, each head land 42 may include a radially outward facing margin surface 50 intersecting its leading edge 46.

In some embodiments of the present invention, each margin surface 50 may extend helically along the central axis A1.

Also, in some embodiments of the present invention, each margin surface 50 may be spaced apart from one of the front surfaces 26 by a margin chamfer 52.

Further, in some embodiments of the present invention, the cutting diameter DC may be measured immediately axially rearward of the three margin chamfers 52.

It should be appreciated throughout the description and claims that the three leading edges 46 may undergo minute axial tapering in the rearward axial direction DR such that the cutting diameter DC is reduced by up to 0.01 mm along the length of the three leading edges 46.

As shown in FIGS. 1 to 3, each primary cutting-edge portion 34 has a radially inner primary end point NIP and a radially outer primary end point NOP.

Also, as shown in FIGS. 1 to 3, each primary cutting-edge portion 34 has a primary median point NMP located between its radially inner and outer primary end points NIP, NOP.

As shown in FIG. 2, the three radially outer primary end points NOP define a first imaginary circle C1 having a first diameter D1, the three primary median points NMP define a second imaginary circle C2 having a second diameter D2, and the three radially inner primary end points NIP define a third imaginary circle C3 having a third diameter D3.

In some embodiments of the present invention, the difference between the first diameter D1 and the third diameter D3 may be greater than thirty-five percent of the cutting diameter DC, i.e. D1−D3>0.35*DC.

In some embodiments of the present invention, the first diameter D1 may be greater than ninety percent of the cutting diameter DC, i.e. D1>0.90*DC.

Also, in some embodiments of the present invention, the first diameter D1 may be less than the cutting diameter DC.

As shown in FIG. 2, in a front-end view of the cutting head 20, each primary cutting-edge portion 34 is concave, i.e. each primary cutting-edge portion 34 has a concave shape.

In some embodiments of the present invention, each primary median point NMP may be located rotationally behind its respective radially inner and outer primary end points NIP, NOP.

It should be appreciated throughout the specification and claims that the location of a point "rotationally behind" or "rotationally ahead" of another point along the same cutting edge 30 is considered with respect to the direction of rotation RD and within the rotational extent of said cutting edge 30.

As shown in FIG. 2, the radially outer primary end point NOP, the primary median point NMP, and the radially inner primary end point NIP of one of the primary cutting-edge portions 34 are respectively contained in first, second, and third imaginary radial planes PR1, PR2, PR3, and each of the first, second, and third imaginary radial planes PR1, PR2, PR3 contains the central axis A1.

In some embodiments of the present invention, the second imaginary radial plane PR2 may be positioned rotationally behind the first and third imaginary radial planes PR1, PR3.

Also, in some embodiments of the present invention, the third imaginary radial plane PR3 may be positioned rotationally ahead of the first imaginary radial plane PR1.

It should be appreciated throughout the specification and claims that the position of an imaginary radial plane "rotationally behind" or "rotationally ahead" of another imaginary radial plane associated with the same cutting edge 30 is considered with respect to the direction of rotation RD and within the rotational extent of said cutting edge 30.

In some embodiments of the present invention, the second and third imaginary radial planes PR2, PR3 may form an acute hook angle θ of at least 10 degrees, i.e. θ≥10°.

For embodiments of the present invention in which each primary cutting-edge portion 34 is concave in a front-end view of the cutting head 20, and the second and third imaginary radial planes PR2, PR3 form an acute hook angle θ of at least 10 degrees, it should be appreciated that each head flute 48 is advantageously configured to maximize the volume of its associated chip evacuation passage 44 and provide sufficient space for smooth and efficient chip evacuation, which may be limited due to the cutting head 20 having more than two circumferentially spaced apart chip evacuation passages 44.

As shown in FIG. 2, in the front-end view of the cutting head 20, each secondary cutting-edge portion 32 may be rectilinear.

In some embodiments of the present invention, each secondary cutting-edge portion 32 may extend rotationally rearwardly as it extends radially outwardly.

Also, in some embodiments of the present invention, each secondary cutting-edge portion 32 may continuously extend rotationally rearwardly as it extends radially outwardly, along its entire length.

For embodiments of the present invention which the secondary and primary cutting-edge portions 32, 34 of each cutting edge 30 are spaced apart by a transitional cutting-edge portion 36, as shown in FIG. 2, in the front-end view of the cutting head 20, each transitional cutting-edge portion 36 may be convex, i.e. each transitional cutting-edge portion 36 may have a convex shape.

As shown in FIGS. 1 to 3, each primary cutting-edge portion 34 is contained in a first imaginary annular ring surface SA1 having a first annular ring width WA1 spanning at least the radially inner and outer primary end points NIP, NOP.

Figure 4:
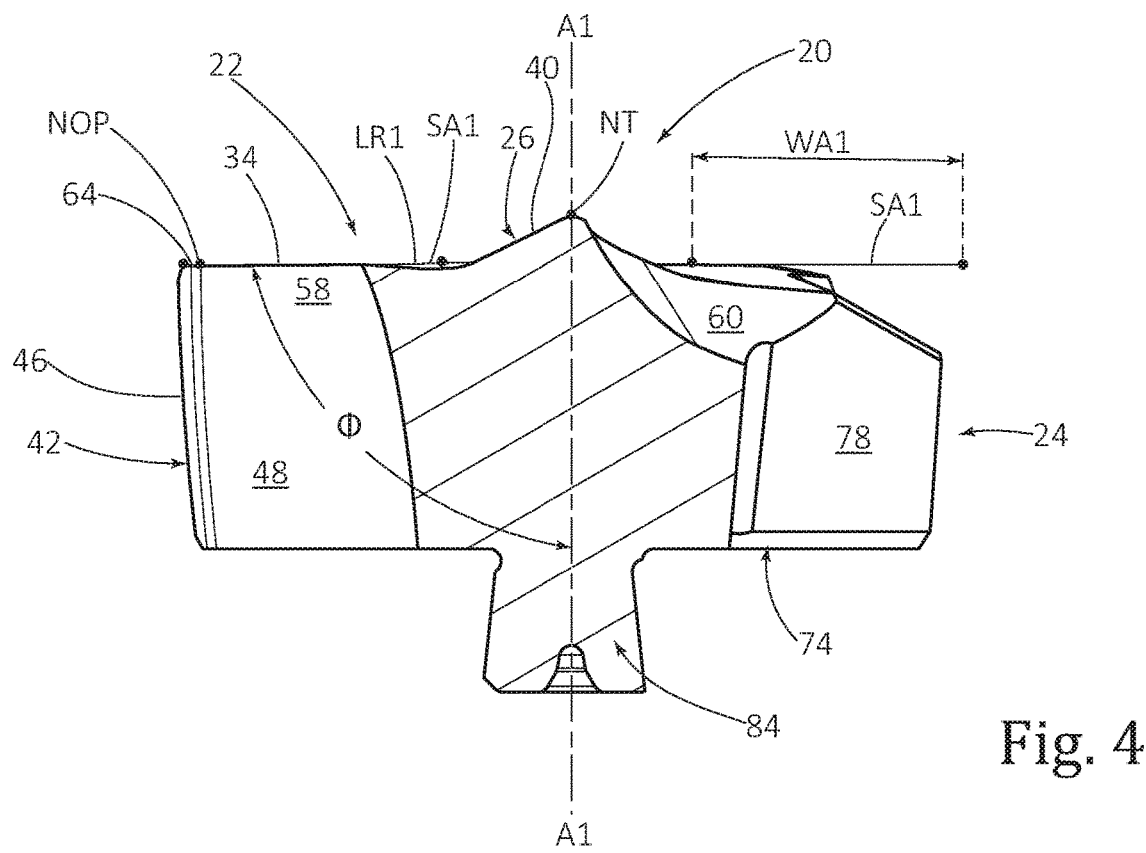
FIG. 4 is a cross-sectional view of the cutting head shown in FIG. 2, taken along the line IV-IV.
Figure 5:
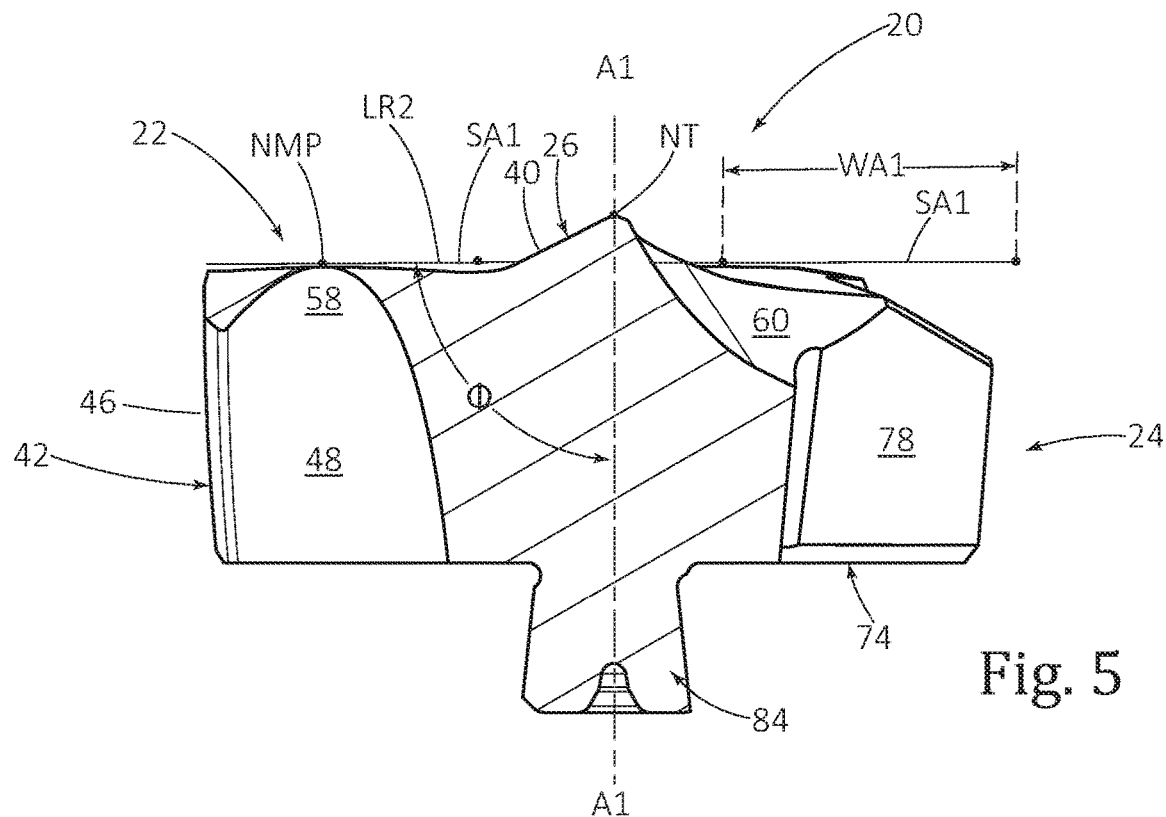
FIG. 5 is a cross-sectional view of the cutting head shown in FIG. 2, taken along the line V-V.
Figure 6:
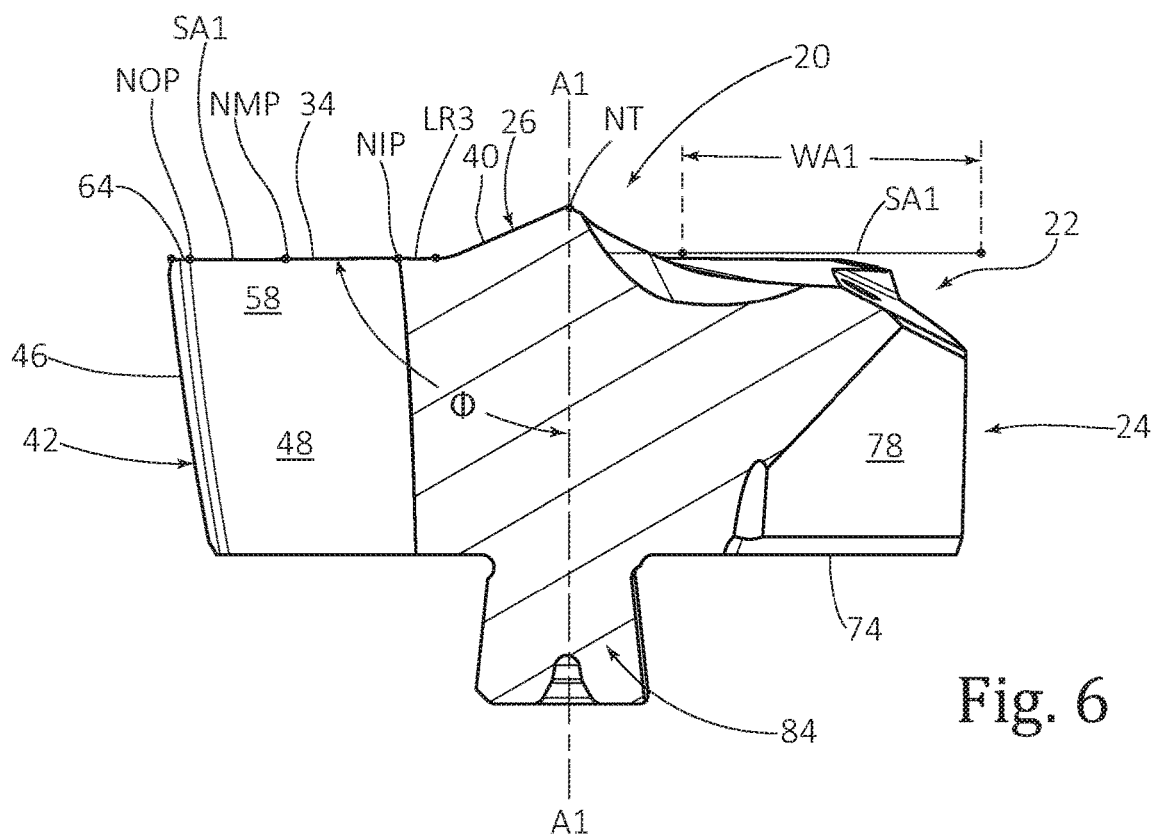
FIG. 6 is a cross-sectional view of the cutting head shown in FIG. 2, taken along the line VI-VI.

According to the present invention, as shown in FIGS. 4 to 6, the first, second, and third imaginary radial planes PR1, PR2, PR3 intersect the first imaginary annular ring surface SA1 to respectively form first, second and third imaginary rectilinear lines LR1, LR2, LR3, each having a length equal to the first annular ring width WA1.

It should be appreciated that any imaginary radial plane containing the central axis A1 may intersect the first imaginary annular ring surface SA1 to form an imaginary rectilinear line having a length equal to the first annular ring width WA1.

It should also be appreciated that the first imaginary annular ring surface SA1 exhibits circular symmetry about the central axis A1, i.e. the first imaginary annular ring surface SA1 has an infinite order of rotational symmetry.

It should be further appreciated that the first, second, and third imaginary rectilinear lines LR1, LR2, LR3, each have a high degree of straightness, and that the three primary cutting-edge portions 34 are configured to form a truly rectilinear rotational profile.

Figure 7:
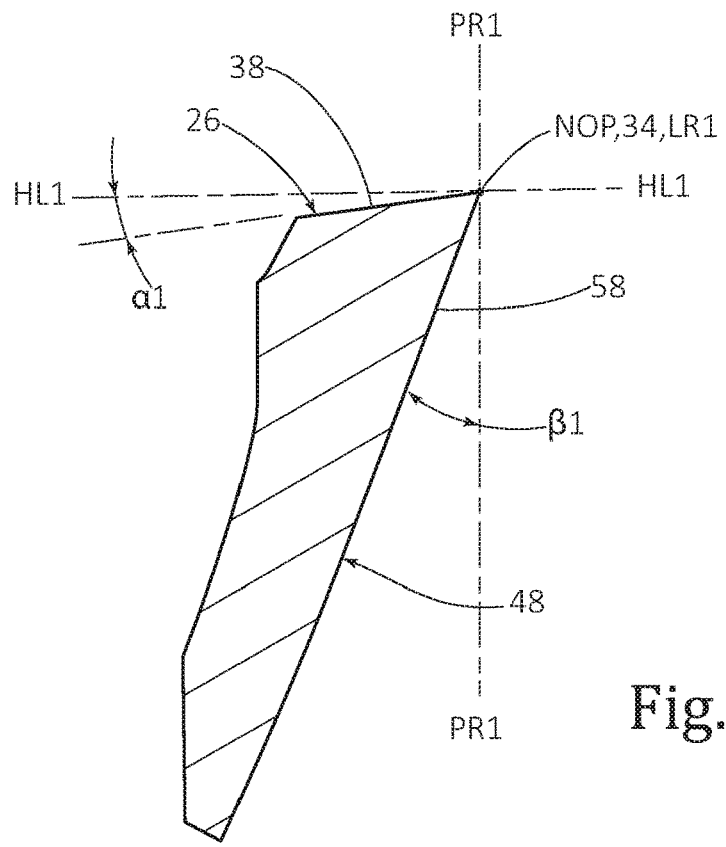
FIG. 7 is a cross-sectional view of the cutting head shown in FIG. 2, taken along the line VII-VII.
Figure 8:
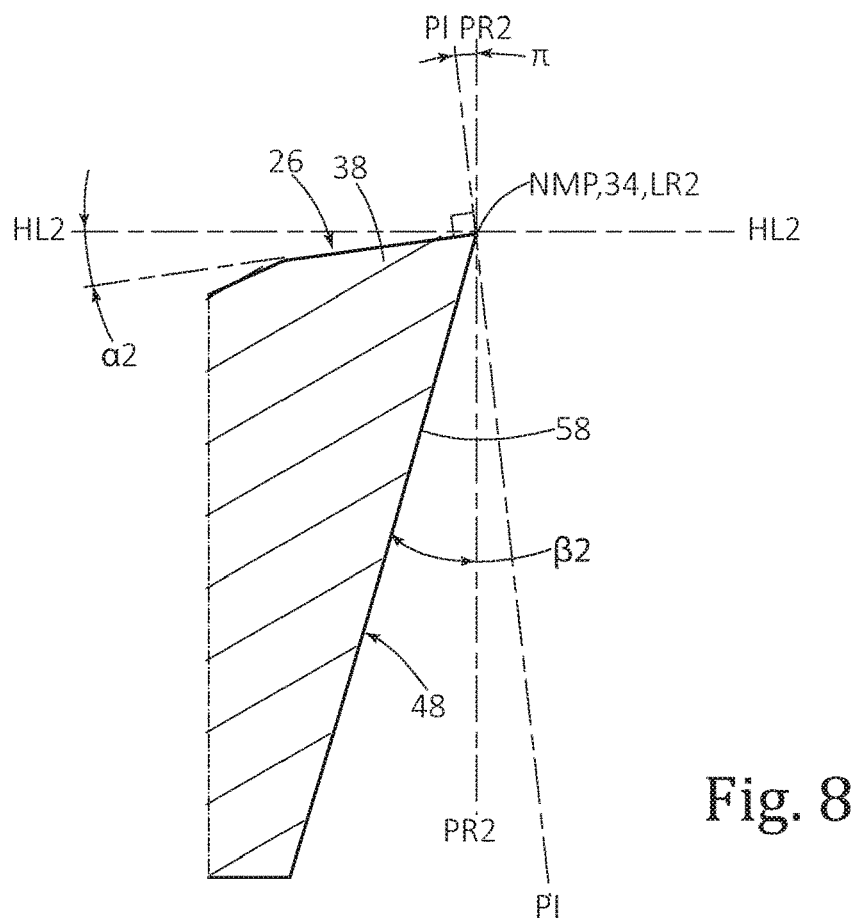
FIG. 8 is a cross-sectional view of the cutting head shown in FIG. 2, taken along the line VIII-VIII.
Figure 9:
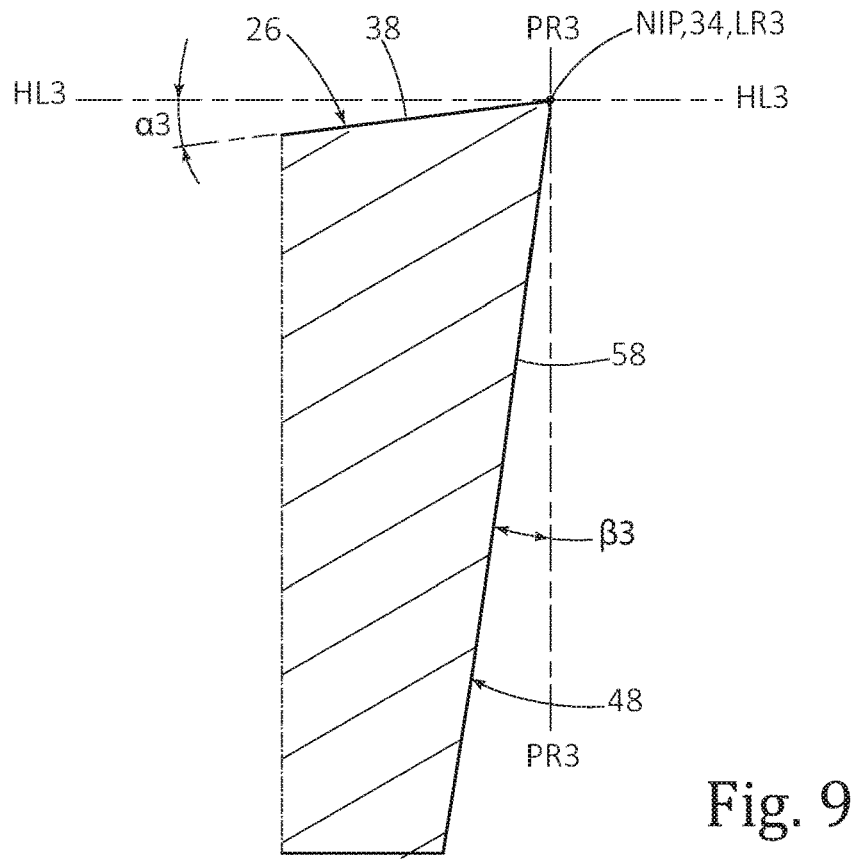
FIG. 9 is a cross-sectional view of the cutting head shown in FIG. 2, taken along the line IX-IX.

As shown in FIGS. 7 to 9, in cross-sections taken in first, second, and third transverse planes PT1, PT2, PT3 perpendicular to the first, second, and third imaginary radial planes PR1, PR2, PR3 and containing the radially outer primary end point NOP, the primary median point NMP, and the radially inner primary end point NIP of the associated primary cutting-edge portion 34, respectively, the adjacent primary relief surface 38 forms first, second, and third acute relief angles α1, α2, α3 relative to first, second, and third imaginary horizontal reference lines HL1, HL2, HL3, respectively, perpendicular to the central axis A1.

In some embodiments of the present invention, the first, second, and third transverse planes PT1, PT2, PT3 may be perpendicular to the first, second and third imaginary rectilinear lines LR1, LR2, LR3, respectively.

Although the first, second, and third transverse planes PT1, PT2, PT3 may only be parallel to the central axis A1 in a specific configuration that the first, second and third imaginary rectilinear lines LR1, LR2, LR3 are perpendicular to the central axis A1 (not shown), it should be appreciated that FIG. 2 shows the first, second, and third transverse planes PT1, PT2, PT3 parallel to the central axis A1 for convenience.

It should be appreciated throughout the specification and claims that at any cross-section taken in a transverse plane intersecting one of the primary cutting-edge portions 34, the adjacent primary relief surface 38 extends axially rearwardly as it extends away from the primary cutting-edge portion 34.

In some embodiments of the present invention, the first, second, and third acute relief angles α1, α2, α3 may be equal, i.e. α1=α2=α3.

It should be appreciated that the first, second, and third acute relief angles α1, α2, α3 may have an accuracy of one degree greater than or less than a nominal value.

It should also be appreciated that configuring the first, second, and third acute relief angles α1, α2, α3 to be equal may advantageously improve the distribution of wear evenly along the primary cutting-edge portions 34.

In some embodiments of the present invention, the first, second, and third relief angles α1, α2, α3 may each have a minimum nominal value of 5 degrees and a maximum nominal value of 12 degrees, i.e. 5°≤α1, α2, α3≤12°.

In the present example of the invention, the first, second, and third acute relief angles α1, α2, α3 have a nominal value of 8°.

As shown in FIG. 8, an imaginary inclined plane PI containing the second imaginary rectilinear line LR2 forms an inclination angle π to the second imaginary radial plane PR2 and intersects the primary relief surface 38 of the respective front surface 26.

In some embodiments of the present invention, the inclination angle π may be equal to the second acute relief angle α2.

For embodiments of the present invention in which the inclination angle π is equal to the second acute relief angle α2, as shown in FIG. 8, it should be appreciated that the imaginary inclined plane PI forms a right angle to the primary relief surface 38 adjacent the primary median point NMP.

In some embodiments of the present invention, the imaginary inclined plane PI may intersect the secondary relief surface 40 of the respective front surface 26.

Figure 10:
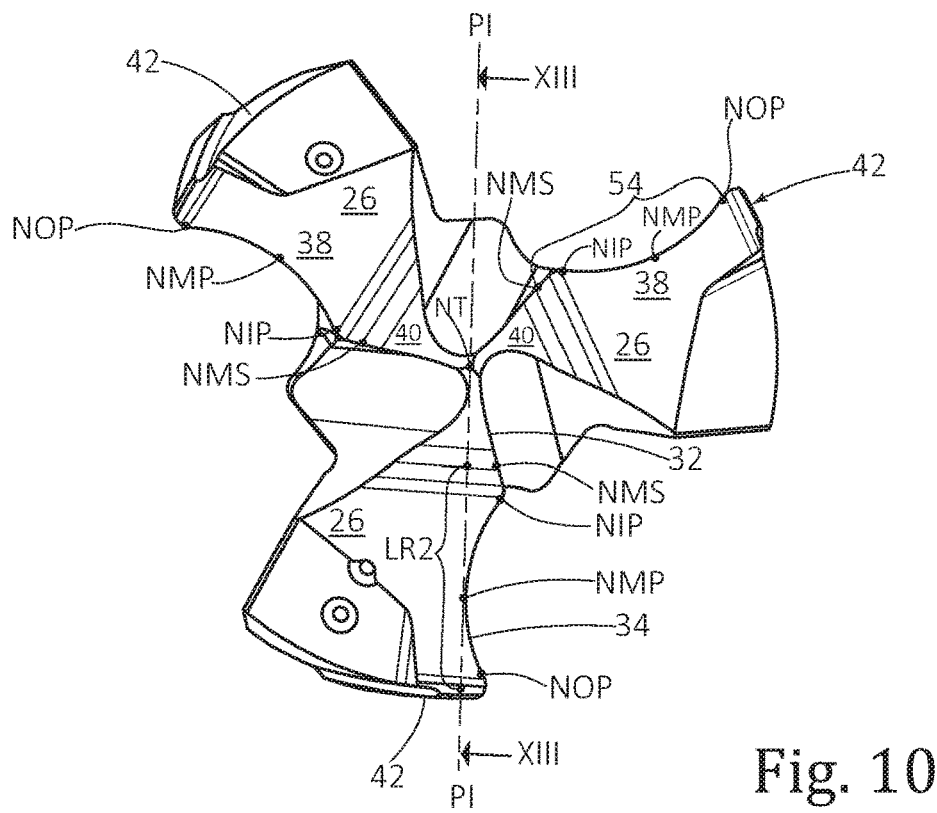
FIG. 10 is a top view of the cutting head shown in FIG. 1, viewed along an imaginary inclined plane.

FIG. 10 shows a top view of the cutting head 20 viewed along the imaginary inclined plane PI.

Figure 11:
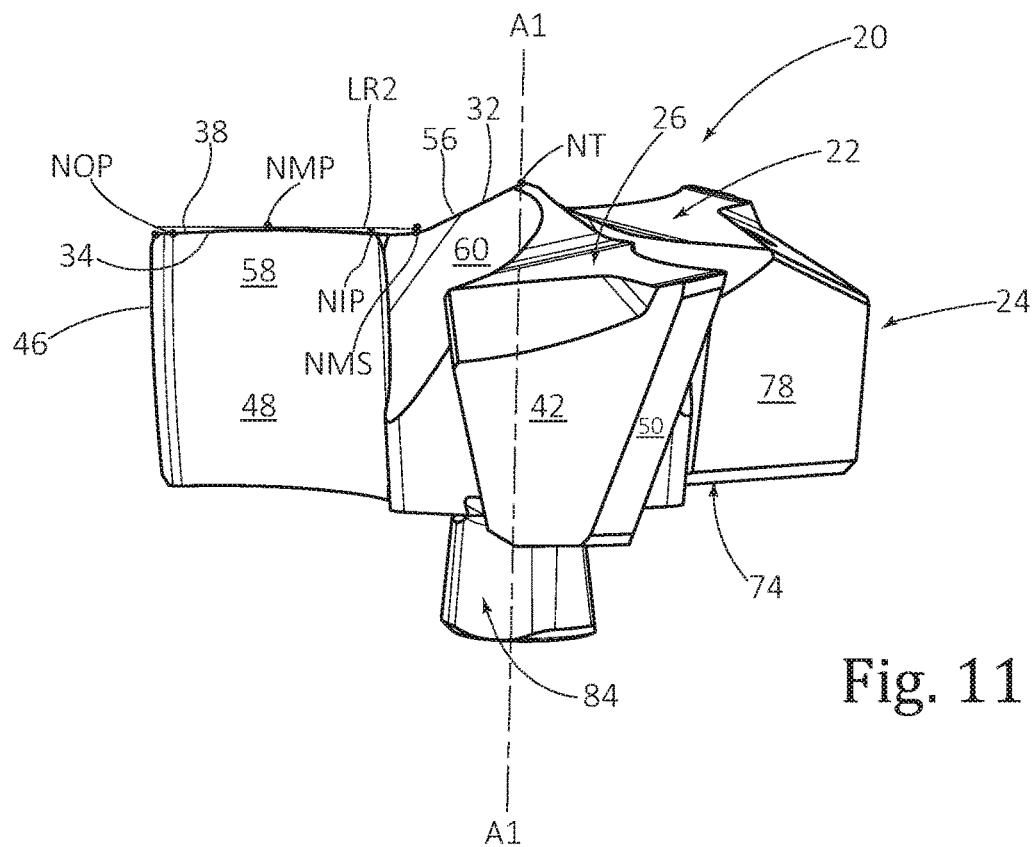
FIG. 11 is a side view of the cutting head shown in FIG. 10.
Figure 12:
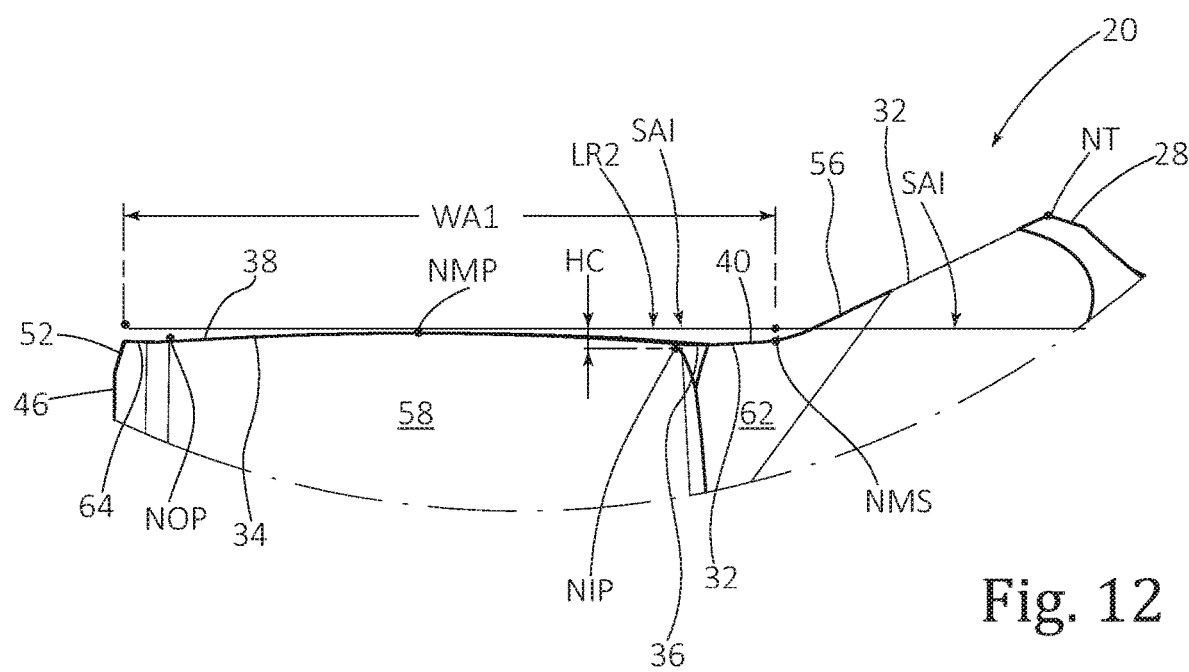
FIG. 12 is a detailed view of a portion of the cutting head shown in FIG. 11.

As shown in FIGS. 11 and 12, in a view perpendicular to the imaginary inclined plane PI, the radially outer primary end point NOP and the radially inner primary end point NIP of the associated primary cutting-edge portion 34 are spaced apart from the second imaginary rectilinear line LR2.

It should be appreciated, as shown in FIGS. 11 and 12, that the primary median point NMP of the associated primary cutting-edge portion 34 lies on the second imaginary rectilinear line LR2.

In some embodiments of the present invention, as shown in FIGS. 11 and 12, the radially outer primary end point NOP and the radially inner primary end point NIP of the associated primary cutting-edge portion 34 may be located on the same side of the second imaginary rectilinear line LR2.

Also, in some embodiments of the present invention, as shown in FIGS. 11 and 12, in the view perpendicular to the imaginary inclined plane PI, the radially inner primary end point NIP may be spaced apart from the second imaginary rectilinear line LR2 by a correction height HC, and the correction height HC may be greater than one percent of the difference between the second diameter D2 and the third diameter D3, i.e., HC>0.01*(D2−D3).

It should be appreciated that the correction height HC may increase for embodiments of the present invention in which the hook angle θ and/or the second relief angle α2 is increased.

Figure 13:
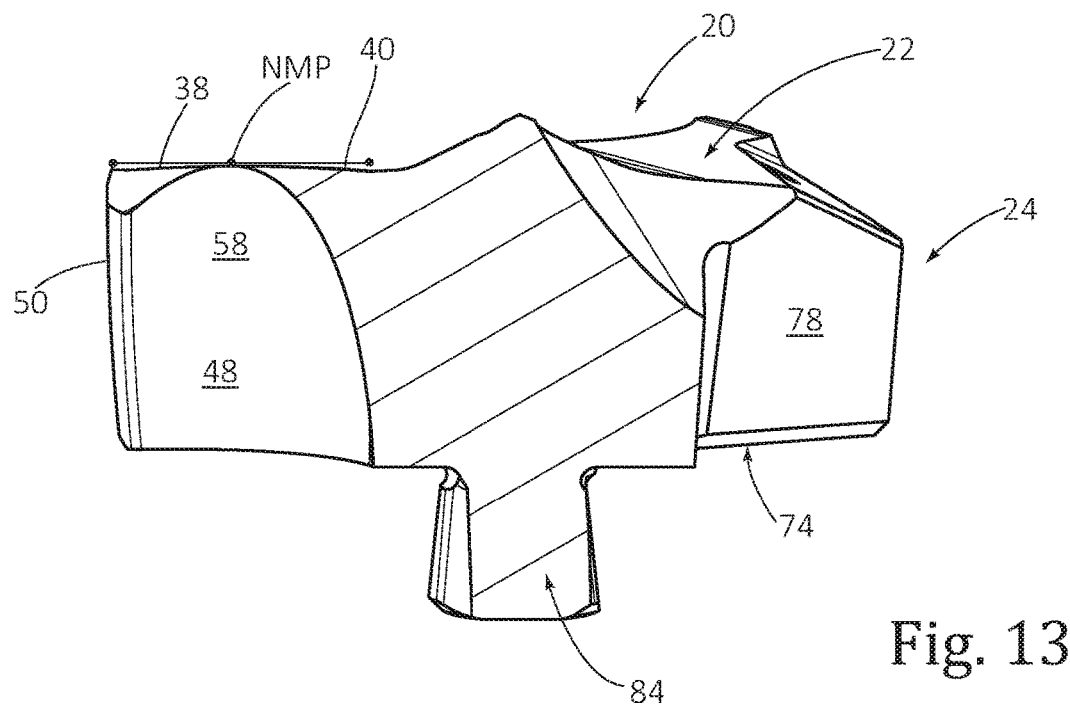
FIG. 13 is a cross-sectional view of the cutting head shown in FIG. 10, taken along the line XIII-XIII.
Figure 14:
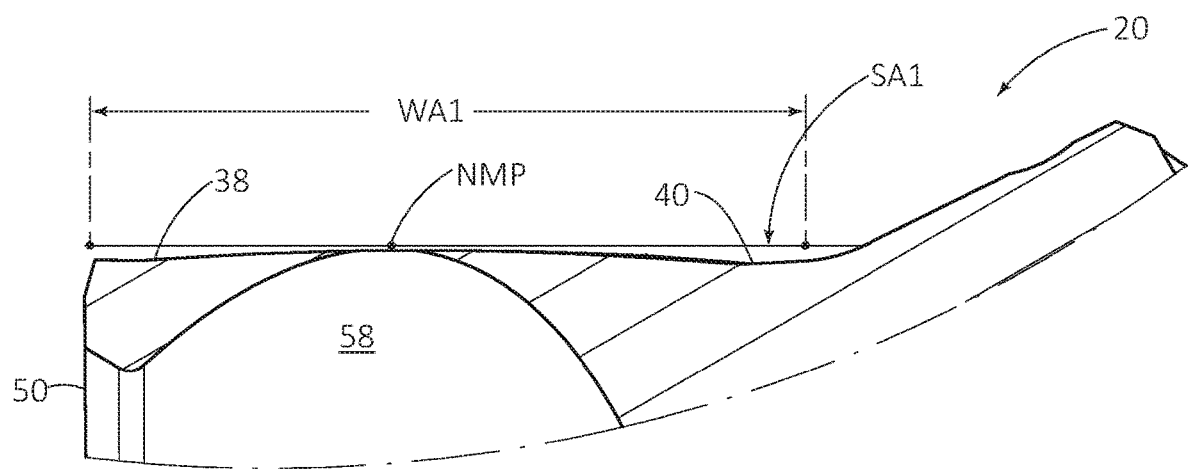
FIG. 14 is a detailed view of a portion of the cutting head shown in FIG. 13.

As shown in FIGS. 13 and 14, in a cross-section taken in the imaginary inclined plane PI, the primary relief surface 38 may be convex, i.e., the primary relief surface 38 may have a convex shape.

For embodiments of the present invention in which each primary relief surface 38 is convex in a cross-section taken in the imaginary inclined plane PI, and the first, second, and third imaginary rectilinear lines LR1, LR2, LR3, each have a high degree of straightness, it should be appreciated that each primary relief surface 38 may be produced by means of a very precise manufacturing method and have a complex radial extent.

In some embodiments of the present invention, each primary relief surface 38 may be produced by a grinding process.

As shown in FIGS. 4 to 6, in cross-sections taken in the first, second and third imaginary radial planes PR1, PR2, PR3, the first, second and third imaginary rectilinear lines LR1, LR2, LR3 may each form an acute or right-angled internal cutting angle φ relative to the central axis A1.

It should be appreciated that the first, second and third imaginary rectilinear lines LR1, LR2, LR3 may each form the same acute or right-angled internal cutting angle φ relative to the central axis A1. For embodiments of the present invention in which the cutting angle φ is an acute angle, it should be appreciated that the first imaginary annular ring surface SA1 may define a 3-dimensional frusto-conical shape, and for embodiments of the present invention in which the cutting angle φ is a right-angle, it should be appreciated that the first imaginary annular ring surface SA1 may define a 2-dimensional annular disc shape.

It should also be appreciated that use of the term "internal cutting angle" throughout the description and claims refers to the angle formed between the first, second and third imaginary rectilinear lines LR1, LR2, LR3 and the portion of the central axis A1 extending through the cutting head's intermediate portion 24.

For embodiments of the present invention in which the cutting angle φ is an acute angle, such that each primary cutting-edge portion 34 has at least a minimal inclination relative to a first horizontal plane PH1 perpendicular to the central axis A1 and intersecting the tip portion 22, it should be appreciated that axial cutting forces acting on the at least three primary cutting-edge portions 34 on initial contact with a workpiece during drill operations, will be progressively spread along said at least three primary cutting-edge portions 34.

In some embodiments of the present invention, as shown in FIGS. 4 to 6, the cutting angle φ may be greater than eighty-eight degrees, i.e. 88°<φ≤90°. Thus, the "first imaginary annular ring surface (SA1)" is either a 3-dimensional truncated conical surface (with a large cone angle of 88°<φ<90°) or a 2-dimensional annular disk-shaped surface (when φ=90°).

It should be appreciated that the cutting angle φ may have an accuracy of half a degree greater than or less than a nominal value.

In the present example of the invention, the cutting angle φ has a nominal value of 89.5°.

For embodiments of the present invention in which the cutting angle φ is greater than eighty-eight degrees, it should be appreciated that at least the three primary cutting-edge portions 34 may be configured to form a virtually flat rotational cutting profile, and the cutting head 20 may be advantageously used in drilling operations to machine a virtually flat shoulder surface (not shown) between two coaxial through holes having different diameters.

In other embodiments of the present invention (not shown), the cutting angle φ may be exactly ninety degrees, i.e. φ=90°.

For embodiments of the present invention in which the cutting angle φ is exactly ninety degrees, it should be appreciated that at least the three primary cutting-edge portions 34 may be configured to form a truly flat rotational cutting profile.

As shown in FIGS. 1 to 3, each secondary cutting-edge portion 32 has a secondary median point NMS located partway along its length.

As shown in FIG. 2, the three secondary median points NMS define a fourth imaginary circle C4 having a fourth diameter D4.

In some embodiments of the present invention, the difference between the first diameter D1 and the fourth diameter D4 may be greater than fifty percent of the cutting diameter DC, i.e. D1−D4>0.50*DC.

As shown in FIG. 2, the secondary median point NMS of one of the secondary cutting-edge portions 32 is contained in a fourth imaginary radial plane PR4, and the fourth imaginary radial plane PR4 contains the central axis A1.

As shown in FIGS. 1 to 3, a combined cutting-edge portion 54 of each cutting edge 30 extending from the said radially outer primary end point NOP to the secondary median point NMS may be contained in the first imaginary annular ring surface SA1.

For embodiments of the present invention in which each combined cutting-edge portion 54 is contained in the first imaginary annular ring surface SA1, and the difference between the first diameter D1 and the fourth diameter D4 is greater than fifty percent of the cutting diameter DC, it should be appreciated that the first annular ring width WA1 may be greater than fifty percent of half the cutting diameter DC i.e. WA1>0.50*DC/2.

Figure 15:
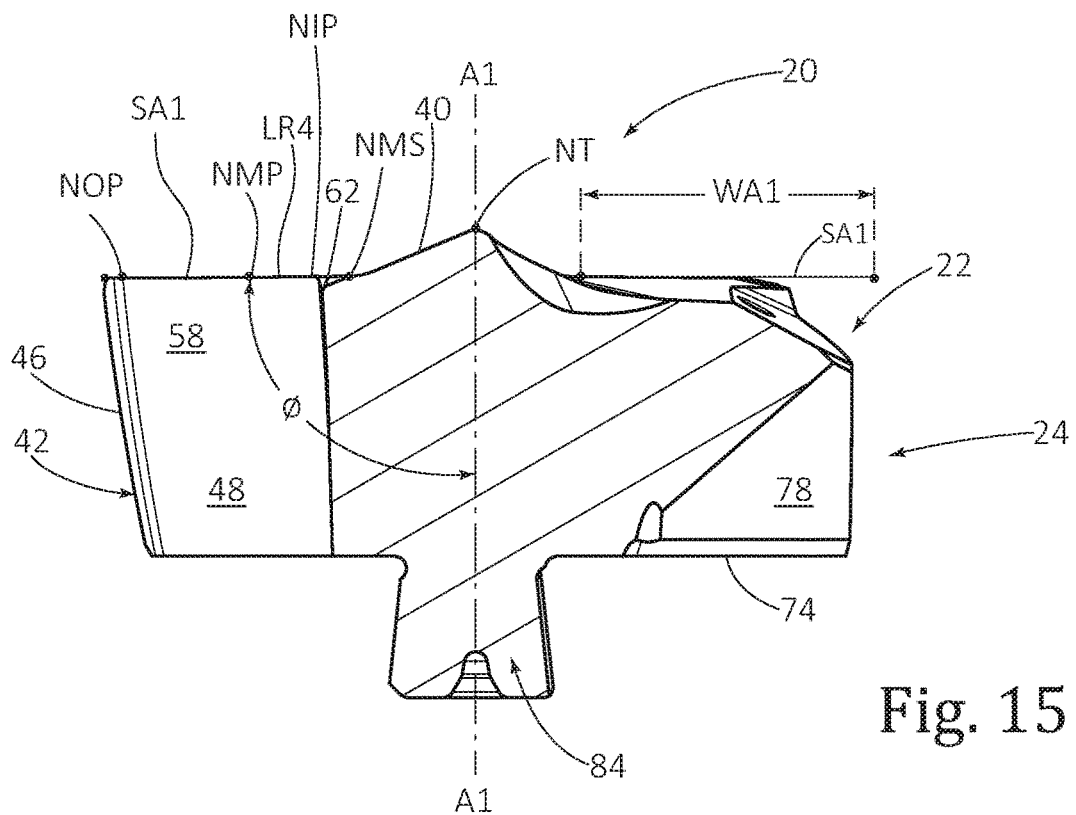
FIG. 15 is a cross-sectional view of the cutting head shown in FIG. 2, taken along the line XV-XV.

As shown in FIG. 15, the fourth imaginary radial plane PR4 intersects the first imaginary annular ring surface SA1 to form a fourth imaginary rectilinear line LR4 having a length equal to the first annular ring width WA1.

As shown in FIG. 15, in a cross-section taken in the fourth imaginary radial plane PR4, the fourth imaginary rectilinear line LR4 may form an acute or right-angled internal cutting angle φ relative to the central axis A1.

In some embodiments of the present invention, it should be appreciated that the first, second, third fourth imaginary rectilinear lines LR1, LR2, LR3, LR4 may each form the same acute or right-angled internal cutting angle φ relative to the central axis A1.

In some embodiments of the present invention, the secondary median point NMS may be located rotationally ahead of the radially inner primary end point NIP of its associated primary cutting-edge portion 34.

As shown in FIG. 2, each secondary cutting-edge portion 32 may extend axially forwardly as it extends radially inwardly from its secondary median point NMS.

In some embodiments of the present invention, as shown in FIGS. 1 to 3, each secondary cutting-edge portion 32 may include a peak cutting-edge sub-portion 56 located radially inward of its secondary median point NMS, and the peak cutting-edge sub-portion 56 may form an acute entry angle relative to a second horizontal plane PH2 perpendicular to the central axis A1 and intersecting the tip portion 22.

Also, in some embodiments of the present invention, as shown in FIG. 3, the entry angle may be at least 15 degrees and at most 30 degrees, i.e. 15°≤λ≤30°.

Further, in some embodiments of the present invention, the first and second horizontal planes PH1, PH2 may be coplanar.

It should be appreciated that the three peak cutting-edge sub-portions 56 may be contained in a second imaginary annular ring surface (not shown), which, in contrast with the first imaginary annular ring surface SA1, may not form an imaginary rectilinear line when intersected by a radial plane.

It should also be appreciated that the portion of each secondary relief surface 40 adjacent the associated peak cutting-edge sub-portion 56 may not have a complex radial extent.

As shown in FIGS. 1 to 3, a primary rake surface 58 may be disposed on each head flute 48 adjacent the associated primary cutting-edge portion 34.

In some embodiments of the present invention, the plurality of primary rake surfaces 58 may face towards the direction of rotation RD.

As shown in FIGS. 7 to 9, in the cross-sections taken in the first, second, and third transverse planes PT1, PT2, PT3, the primary rake surface 58 is inclined at first, second, and third axial rake angles β1, β2, β3, respectively, relative to the first, second and third imaginary radial planes PR1, PR2, PR3.

In some embodiments of the present invention, each of the first, second, and third axial rake angles β1, β2, β3 may be positive.

It should be appreciated throughout the specification and claims that the first, second, and third axial rake angles β1, β2, β3 are positive in a configuration that the respective portion of the primary rake surface 58 extends rotationally rearwardly as it extends away from the associated primary cutting-edge portion 34.

It should also be appreciated that the primary cutting-edge portions 34 are susceptible to greater wear than the secondary cutting-edge portions 32 due to their relatively higher cutting speeds, and that configuring the first, second, and third axial rake angles β1, β2, β3 to be positive reduces wear on the primary cutting-edge portions 34, thus prolonging the operative life thereof.

Figure 16:
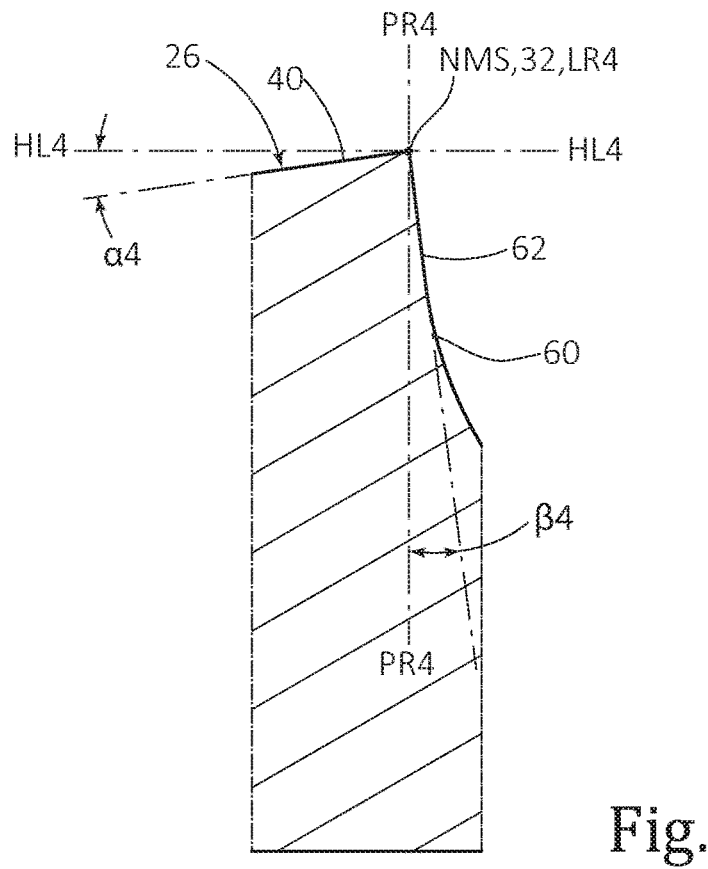
FIG. 16 is a cross-sectional view of the cutting head shown in FIG. 2, taken along the line XVI-XVI.

As shown in FIG. 16, in a cross-section taken in a fourth imaginary transverse plane PT4 perpendicular to the fourth imaginary radial plane PR4 and containing the secondary median point NMS of the associated secondary cutting-edge portion 32, the adjacent secondary relief surface 40 forms a fourth acute relief angle α4, relative to a fourth imaginary horizontal reference line HL4 perpendicular to the central axis A1.

In some embodiments of the present invention, the fourth imaginary transverse plane PT4 may be perpendicular to the fourth imaginary rectilinear line LR4, although FIG. 2 shows the fourth imaginary transverse plane PT4 parallel to the central axis A1 for convenience.

It should be appreciated throughout the specification and claims that at any cross-section taken in a transverse plane parallel to the central axis A1 and intersecting one of the secondary cutting-edge portions 32, the secondary relief surface 40 extends axially rearwardly as it extends away from the primary cutting-edge portion 34.

In some embodiments of the present invention, the fourth acute relief angle α4 may be equal to the first, second, and third acute relief angles α1, α2, α3.

As shown in FIGS. 1 to 3, each chip evacuation passage 44 may have a gash 60 extending axially rearwardly from the tip portion 22 and intersecting one of the head flutes 48.

In some embodiments of the present invention, each secondary cutting-edge portion 32 may be formed at the intersection of one of the gashes 60 and one of the secondary relief surfaces 40.

As shown in FIGS. 1 to 3, a secondary rake surface 62 may be disposed on each gash 60 adjacent the associated secondary cutting-edge portion 32.

In some embodiments of the present invention, the plurality of secondary rake surfaces 62 may face towards the direction of rotation RD.

As shown in FIG. 16, in the cross-section taken in the fourth imaginary transverse plane PT4, the secondary rake surface 62 is inclined at a fourth axial rake angle β4 relative to the fourth imaginary radial plane PR4.

In some embodiments of the present invention, the fourth axial rake angle β4 may be negative.

Also, in some embodiments of the present invention, the negative fourth axial rake angle β4 may have a magnitude of greater than 4 degrees.

It should be appreciated throughout the specification and claims that the fourth axial rake angle β4 is negative in a configuration that the respective portion of the secondary rake surface 62 extends rotationally forwardly as it extends away from the secondary cutting-edge portion 32.

It should also be appreciated that the secondary cutting-edge portions 32 are susceptible to greater impact forces than the primary cutting-edge portions 34 due to their relatively lower cutting speeds, especially at high feed rates, and that configuring the fourth axial rake angle β4 to be negative increases the stability and robustness of the secondary cutting-edge portions 32, thus prolonging the operative life thereof.

For embodiments of the present invention in which the first diameter D1 is less than the cutting diameter DC, each cutting edge 30 may include a tertiary cutting-edge portion 64 extending radially outwardly from the radially outer primary end point NOP of its primary cutting-edge portion 34.

As shown in FIG. 2, in the front-end view of the cutting head 20, each tertiary cutting-edge portion 64 may be convex, i.e. each tertiary cutting-edge portion 64 may have a convex shape.

In some embodiments of the present invention, each tertiary cutting-edge portion 64 may be contained in the first imaginary annular ring surface SA1.

As shown in FIGS. 1 to 3, each tertiary cutting-edge portion 64 has a radially inner tertiary end point NIT and a radially outer tertiary end point NOT.

In some embodiments of the present invention, the radially inner tertiary end point NIT of each tertiary cutting-edge portion 64 may be coincident with the radially outer primary end point NOP of the associated primary cutting-edge portion 34.

As shown in FIG. 2, in the front-end view of the cutting head 20, a first imaginary straight line L1 tangential to one of the tertiary cutting-edge portions 64 adjacent its radially outer tertiary end point NOT may form a negative radial rake angle δ relative to a second imaginary straight line L2 containing the radially outer tertiary end point NOT and intersecting the central axis A1.

It should be appreciated throughout the specification and claims that the radial rake angle δ is negative in a configuration that the first imaginary straight line L1 extends rotationally rearwardly as it extends radially outwardly from the tertiary cutting-edge portion 64.

Figure 17:
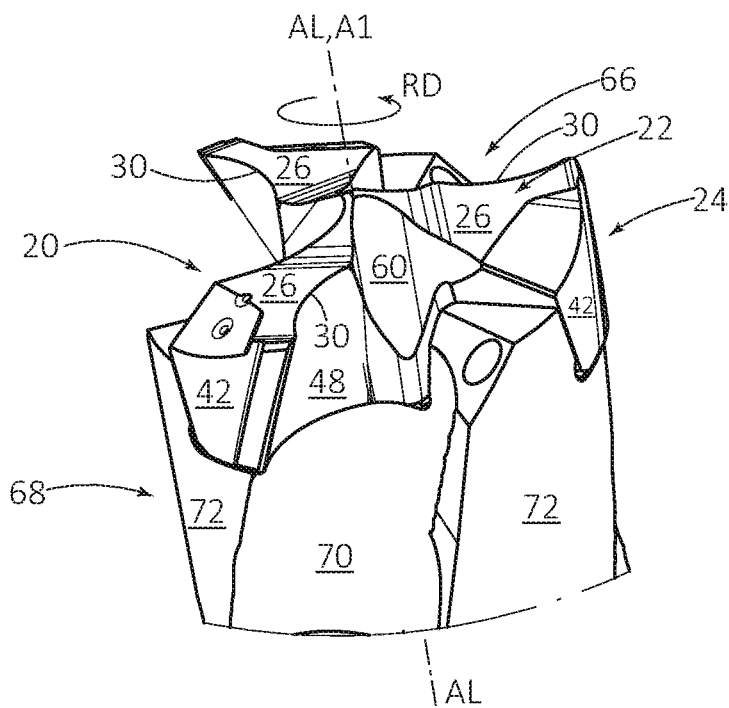
FIG. 17 is a perspective view of a rotary cutting tool in accordance with the present invention.
Figure 18:
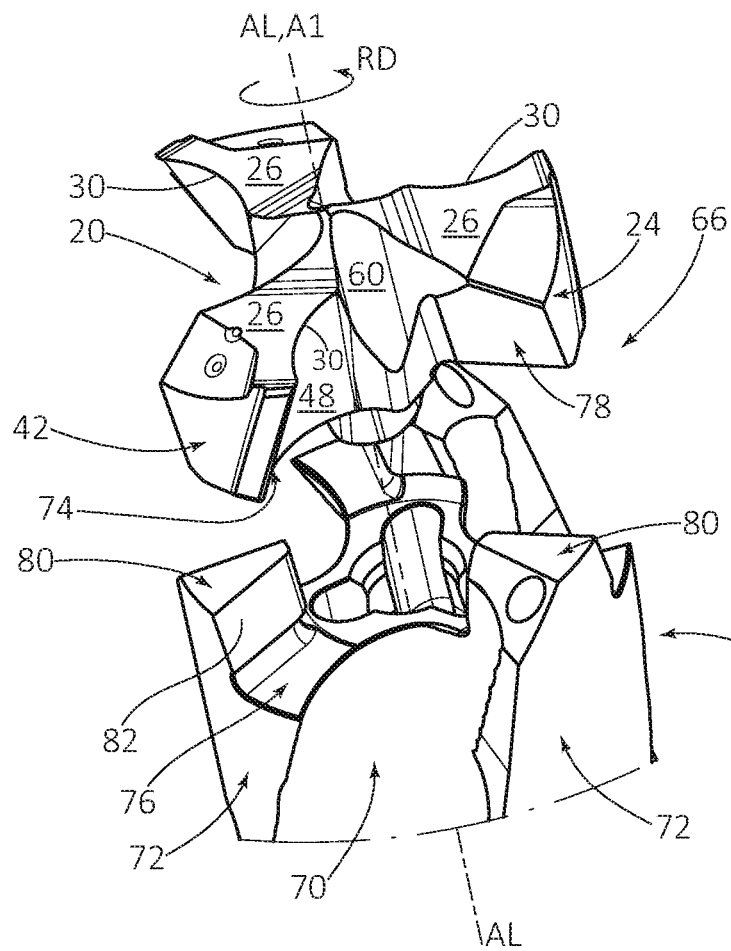
FIG. 18 is an exploded view of the rotary cutting tool shown in FIG. 17.

Attention is now drawn to FIGS. 17 and 18, showing a rotary cutting tool 66 according to the present invention, comprising the cutting head 20 and a shank 68 having a longitudinal axis AL.

The shank 68 has three shank flutes 70 circumferentially alternating with three shank lands 72, and each shank flute 70 may extend helically along the longitudinal axis AL.

As shown in FIGS. 17 and 18, the cutting head 20 may have an axially rearward facing bottom surface 74, the shank 68 may have a support surface 76 transverse to the longitudinal axis AL, and the cutting head 20 may be removably mounted to the shank 68 with the bottom surface 74 in contact with the support surface 76.

Configuring the cutting head 20 to be removably mounted to the shank 68 enables the cutting head 20 to be manufactured from a suitably hard material, such as tungsten carbide, and the shank 68 to be manufactured from a less hard and less expensive material, such as high-speed steel. The shank 68 may be reusable following disposal of a worn or damaged cutting head 20.

In some embodiments of the present invention, each head flute 48 may intersect the bottom surface 74 and cooperate with one of the shank flutes 70.

Also, in some embodiments of the present invention, the bottom surface 74 may be perpendicular to the central axis A1, the support surface 76 may be perpendicular to the longitudinal axis AL, and the central axis A1 may be coaxial with the longitudinal axis AL.

As shown in FIGS. 17 and 18, the intermediate portion 24 of the cutting head 20 may include three torque transmission surfaces 78 facing opposite the direction of rotation RD, the shank 68 may include three drive protuberances 80, with each drive protuberance 80 having a drive surface 82 facing the direction of rotation RD, and each torque transmission surface 78 may be in contact with one of the drive surfaces 82.

In some embodiments of the present invention, each torque transmission surfaces 78 may intersect one of the front surfaces 26.

As shown in FIGS. 17 and 18, the cutting head 20 may include a mounting protuberance 84 extending axially rearwardly from the bottom surface 74.

In other embodiments of the present invention (not shown), the cutting head 20 and the shank 68 may be integral parts of a unitary one-piece construction, for example, a solid drill, and each head flute 48 may merge with one of the shank flutes 70.

Although the present invention has been described to a certain degree of particularity, it should be understood that various alterations and modifications could be made without departing from the spirit or scope of the invention as hereinafter claimed.

What is claimed is:

1. A cutting head (20) rotatable about a central axis (A1) in a direction of rotation (RD), the central axis (A1) defining a forward-to-rearward axial direction (DF, DR), and comprising:

a tip portion (22) having an axially forwardmost tip point (NT) contained in the central axis (A1) and three axially forward-facing front surfaces (26) forming three chisel edges (28) extending axially rearwardly away from the tip point (NT), each front surface (26) having a radially extending cutting edge (30) comprising a secondary cutting-edge portion (32) extending radially outwardly from one of the chisel edges (28), and a primary cutting-edge portion (34) extending radially outwardly either directly from said secondary cutting-edge portion (32) or via a transitional cutting-edge portion (36); and each front surface (26) further including a primary relief surface (38) adjacent its respective primary cutting-edge portion (34), and an intermediate portion (24) having three head lands (42) circumferentially alternating with three chip evacuation passages (44), each head land (42) having a leading edge (46) extending axially rearwardly from the tip portion (22), and each chip evacuation passage (44) having a head flute (48) extending axially rearwardly from the tip portion (22) and intersecting one of the leading edges (46), wherein:

each primary cutting-edge portion (34) has a radially inner primary end point (NIP) and a radially outer primary end point (NOP), and a primary median point (NMP) between said radially inner and outer primary end points (NIP, NOP), the three radially outer primary end points (NOP) defining a first imaginary circle (C1) having a first diameter (D1), the three primary median points (NMP) defining a second imaginary circle (C2)

having a second diameter (D2), and the three radially inner primary end points (NIP) defining a third imaginary circle (C3) having a third diameter (D3), the radially outer primary end point (NOP), the primary median point (NMP), and the radially inner primary end point (NIP) of one of the primary cutting-edge portions (34) are respectively contained in first, second, and third imaginary radial planes (PR1, PR2, PR3), each of the first, second, and third imaginary radial planes (PR1, PR2, PR3) containing the central axis (A1), each primary cutting-edge portion (34) is contained in a first imaginary annular ring surface (SA1) having a first annular ring width (WA1) spanning at least the radially inner and outer primary end points (NIP, NOP), and in a front-end view of the cutting head (20), each primary cutting-edge portion (34) is concave, and wherein:

the first, second, and third imaginary radial planes (PR1, PR2, PR3) intersect the first imaginary annular ring surface (SA1) to respectively form first, second, and third imaginary rectilinear lines (LR1, LR2, LR3), each having a length equal to the first annular ring width (WA1);

in cross-sections taken in first, second, and third transverse planes (PT1, PT2, PT3) perpendicular to the first, second, and third imaginary radial planes (PR1, PR2, PR3) and containing the radially outer primary end point (NOP), primary median point (NMP), and radially inner primary end point (NIP) of the associated primary cutting-edge portion (34), respectively, the adjacent primary relief surface (38) forms first, second, and third acute relief angles ($\alpha 1$, $\alpha 2$, $\alpha 3$), relative to first, second, and third imaginary horizontal reference lines (HL1, HL2, HL3) perpendicular to the central axis (A1), respectively;

an imaginary inclined plane (PI) containing the second imaginary rectilinear line (LR2) forms an inclination angle ($\pi$) to the second imaginary radial plane (PR2) and intersects the primary relief surface (38) of the respective front surface (26);

the inclination angle ($\pi$) is equal to the second acute relief angle ($\alpha 2$);

in a view perpendicular to the imaginary inclined plane (PI), the radially outer primary end point (NOP) and the radially inner primary end point (NIP) of the associated primary cutting-edge portion (34) are spaced apart from the second imaginary rectilinear line (LR2); and in a cross-section taken in the imaginary inclined plane (PI), the primary relief surface (38) is convex.

2. The cutting head (20) according to claim 1, wherein:
the second imaginary radial plane (PR2) is positioned rotationally behind the first and third imaginary radial planes (PR1, PR3).

3. The cutting head (20) according to claim 1, wherein:
the second and third imaginary radial planes (PR2, PR3) form an acute hook angle ($\theta$) of at least 10 degrees.

4. The cutting head (20) according to claim 1, wherein:
in the view perpendicular to the imaginary inclined plane (PI), the radially inner primary end point (NIP) is spaced apart from the second imaginary rectilinear line (LR2) by a correction height (HC), and the correction height (HC) is greater than one percent of the difference between the second diameter (D2) and the third diameter (D3).

5. The cutting head (20) according to claim 1, wherein:
in the view perpendicular to the imaginary inclined plane (PI), the radially outer primary end point (NOP) and the radially inner primary end point (NIP) of the associated primary cutting-edge portion (34) are located on the same side of the second imaginary rectilinear line (LR2).

6. The cutting head (20) according to claim 1, wherein:
the first, second, and third relief angles ($\alpha 1$, $\alpha 2$, $\alpha 3$) each have a minimum nominal value of 5 degrees and a maximum nominal value of 12 degrees.

7. The cutting head (20) according to claim 1, wherein:
the first, second, and third relief angles ($\alpha 1$, $\alpha 2$, $\alpha 3$) are equal.

8. The cutting head (20) according to claim 7, wherein:
each secondary cutting-edge portion $\beta 2$) has a secondary median point (NMS) located partway along its length, the three secondary median points (NMS) defining a fourth imaginary circle (C4) having a fourth diameter (D4), the secondary median point (NMS) of one of the secondary cutting-edge portions (32) is contained in a fourth imaginary radial plane (PR4), and the fourth imaginary radial plane (PR4) contains the central axis A1, a combined cutting-edge portion (54) of each cutting edge (30) extending from the said radially outer primary end point (NOP) to the secondary median point (NMS) is contained in the first imaginary annular ring surface (SA1), and the fourth imaginary radial plane (PR4) intersects the first imaginary annular ring surface (SA1) to form a fourth imaginary rectilinear line (LR4) having a length equal to the first annular ring width (WA1).

9. The cutting head (20) according to claim 8, wherein:
each front surface (26) has a secondary relief surface (40) adjacent its respective secondary cutting-edge portion (32), in a cross-section taken in a fourth transverse plane (PT4) perpendicular to the fourth imaginary radial plane (PR4) and containing the secondary median point (NMS) of the associated secondary cutting-edge portion (32), the adjacent secondary relief surface (40) forms a fourth relief angle ($\alpha 4$), relative to a fourth imaginary horizontal reference line (HL4) perpendicular to the central axis (A1), and the fourth acute relief angle ($\alpha 4$) is equal to the first, second, and third acute relief angles ($\alpha 1$, $\alpha 2$, $\alpha 3$).

10. The cutting head (20) according to claim 9, wherein:
each chip evacuation passage (44) has a gash (60) extending axially rearwardly from the tip portion (22) and intersecting one of the head flutes (48), each secondary cutting-edge portion $\beta 2$) is formed at the intersection of one of the gashes (60) and one of the secondary relief surfaces (40), a secondary rake surface (62) is disposed on each gash (60) adjacent the associated secondary cutting-edge portion (32), in the cross-section taken in the fourth transverse plane (PT4), the secondary rake surface (62) is inclined at a fourth axial rake angle ($\beta 4$) relative to the fourth imaginary radial plane (PR4), and the fourth axial rake angle ($\beta 4$) is negative.

11. The cutting head (20) according to claim 10, wherein the negative fourth axial rake angle ($\beta 4$) has a magnitude of greater than 4 degrees.

12. The cutting head (20) according to claim 8, wherein:
the three leading edges (46) define a cutting diameter (DC), and the difference between the first diameter (D1) and the third diameter (D3) is greater than thirty-five percent of the cutting diameter (DC).

13. The cutting head (20) according to claim 12, wherein:
the difference between the first diameter (D1) and the fourth diameter (D4) is greater than fifty percent of the cutting diameter (DC).

14. The cutting head (20) according to claim 8, wherein:
each secondary cutting-edge portion (32) extends axially forwardly as it extends radially inwardly from its secondary median point (NMS).

15. The cutting head (20) according to claim 8, wherein:
each secondary cutting-edge portion (32) includes a peak cutting-edge sub-portion (56) located radially inward of its secondary median point (NMS),
the peak cutting-edge sub-portion (56) forms an acute entry angle ($\lambda$) relative to a second horizontal plane (PH2) perpendicular to the central axis (A1), and
the entry angle ($\lambda$) is at least 15 degrees and at most 30 degrees.

16. The cutting head (20) according to claim 1, wherein:
each primary cutting-edge portion (34) is formed at the intersection of one of the head flutes (48) and one of the primary relief surfaces (38),
a primary rake surface (58) is disposed on each head flute (48) adjacent the associated primary cutting-edge portion (34),
in the cross-sections taken in the first, second, and third transverse planes (PT1, PT2, PT3), the primary rake surface (58) is inclined at first, second, and third axial rake angles ($\beta1$, $\beta2$, $\beta3$), respectively, relative to the first, second, and third imaginary radial planes (PR1, PR2, PR3), respectively, and
each of the first, second, and third axial rake angles ($\beta1$, $\beta2$, $\beta3$) is positive.

17. The cutting head (20) according to claim 1, wherein:
in the front-end view of the cutting head (20), each secondary cutting-edge portion $\beta2$) is rectilinear.

18. The cutting head (20) according to claim 17, wherein:
each secondary cutting-edge portion $\beta2$) extends rotationally rearwardly as it extends radially outwardly.

19. The cutting head (20) according to claim 1, wherein:
in the front-end view of the cutting head (20), each transitional cutting-edge portion (36) is convex.

20. The cutting head (20) according to claim 1, wherein:
in cross-sections taken in the first, second, and third imaginary radial planes (PR1, PR2, PR3), the first, second, and third imaginary rectilinear lines (LR1, LR2, LR3) each form an acute or right-angled internal cutting angle (d)) relative to the central axis (A1), and
the cutting angle ($\phi$) is greater than eighty-eight degrees.

21. The cutting head (20) according to claim 20, wherein:
in the cross-sections taken in the first, second, and third imaginary radial planes (PR1, PR2, PR3), the first, second, and third imaginary rectilinear lines (LR1, LR2, LR3) each form the same acute or right-angled internal cutting angle ($\phi$)) relative to the central axis (A1).

22. The cutting head (20) according to claim 1, wherein:
the first imaginary annular ring surface (SA1) is either a 3-dimensional truncated conical surface or a 2-dimensional annular disk-shaped surface; and
the three primary cutting-edge portions (34) are configured to form a rectilinear rotational profile.

23. A cutting head (20) rotatable about a central axis (A1) in a direction of rotation (RD), the central axis (A1) defining a forward-to-rearward axial direction (DF, DR), and comprising:
a tip portion (22) having an axially forwardmost tip point (NT) contained in the central axis (A1) and three axially forward-facing front surfaces (26) forming three chisel edges (28) extending axially rearwardly away from the tip point (NT),
each front surface (26) having a radially extending cutting edge (30) comprising a secondary cutting-edge portion $\beta2$) extending radially outwardly from one of the chisel edges (28), and a primary cutting-edge portion (34) extending radially outwardly either directly from said secondary cutting-edge portion $\beta2$) or via a transitional cutting-edge portion (36); and
each front surface (26) further including a primary relief surface (38) adjacent its respective primary cutting-edge portion (34), and
an intermediate portion (24) having three head lands (42) circumferentially alternating with three chip evacuation passages (44), each head land (42) having a leading edge (46) extending axially rearwardly from the tip portion (22), and each chip evacuation passage (44) having a head flute (48) extending axially rearwardly from the tip portion (22) and intersecting one of the leading edges (46),
wherein:
each primary cutting-edge portion (34) has a radially inner primary end point (NIP) and a radially outer primary end point (NOP), and a primary median point (NMP) between said radially inner and outer primary end points (NIP, NOP), the three radially outer primary end points (NOP) defining a first imaginary circle (C1) having a first diameter (D1), the three primary median points (NMP) defining a second imaginary circle (C2) having a second diameter (D2), and the three radially inner primary end points (NIP) defining a third imaginary circle (C3) having a third diameter (D3),
the radially outer primary end point (NOP), the primary median point (NMP), and the radially inner primary end point (NIP) of one of the primary cutting-edge portions (34) are respectively contained in first, second, and third imaginary radial planes (PR1, PR2, PR3), each of the first, second, and third imaginary radial planes (PR1, PR2, PR3) containing the central axis (A1),
each primary cutting-edge portion (34) is contained in a first imaginary annular ring surface (SA1) having a first annular ring width (WA1) spanning at least the radially inner and outer primary end points (NIP, NOP), and
in a front-end view of the cutting head (20), each primary cutting-edge portion (34) is concave,
and wherein:
the first, second, and third imaginary radial planes (PR1, PR2, PR3) intersect the first imaginary annular ring surface (SA1) to respectively form first, second, and third imaginary rectilinear lines (LR1, LR2, LR3), each having a length equal to the first annular ring width (WA1);
in cross-sections taken in first, second, and third transverse planes (PT1, PT2, PT3) perpendicular to the first, second, and third imaginary radial planes (PR1, PR2, PR3) and containing the radially outer primary end point (NOP), primary median point (NMP), and radially inner primary end point (NIP) of the associated primary cutting-edge portion (34), respectively, the adjacent primary relief surface (38) forms first, second, and third acute relief angles ($\alpha 1$, $\alpha 2$, $\alpha 3$), relative to first, second, and third imaginary horizontal reference lines (HL1, HL2, HL3) perpendicular to the central axis (A1), respectively;

an imaginary inclined plane (PI) containing the second imaginary rectilinear line (LR2) forms an inclination angle ($\pi$) to the second imaginary radial plane (PR2) and intersects the primary relief surface (38) of the respective front surface (26);

the inclination angle ($\pi$) is equal to the second acute relief angle ($\alpha 2$);

in a view perpendicular to the imaginary inclined plane (PI), the radially outer primary end point (NOP) and the radially inner primary end point (NIP) of the associated primary cutting-edge portion (34) are spaced apart from the second imaginary rectilinear line (LR2); and in the view perpendicular to the imaginary inclined plane (PI), the radially outer primary end point (NOP) and the radially inner primary end point (NIP) of the associated primary cutting-edge portion (34) are located on the same side of the second imaginary rectilinear line (LR2).

\* \* \* \* \*